United States Patent
Smith

(10) Patent No.: US 10,054,966 B2
(45) Date of Patent: Aug. 21, 2018

(54) BATTERY BACKUP UNITS AND SYSTEMS INCLUDING BYPASSING CIRCUITRY FOR REGULATING OUTPUTS

(71) Applicant: Emerson Network Power, Energy Systems, North America, Inc., Warrenville, IL (US)

(72) Inventor: Michael Francis Smith, Columbia Station, OH (US)

(73) Assignee: VERTIV ENERGY SYSTEMS, INC., Lombard, IL (US)

( * ) Notice: Subject to any disclaimer, the term of this patent is extended or adjusted under 35 U.S.C. 154(b) by 369 days.

(21) Appl. No.: 14/748,544

(22) Filed: Jun. 24, 2015

(65) Prior Publication Data

US 2015/0380930 A1  Dec. 31, 2015

Related U.S. Application Data

(60) Provisional application No. 62/017,028, filed on Jun. 25, 2014.

(51) Int. Cl.

| | |
|---|---|
| *G05F 1/563* | (2006.01) |
| *G06F 1/26* | (2006.01) |
| *H02M 1/36* | (2007.01) |
| *H02J 9/06* | (2006.01) |
| *G05F 1/46* | (2006.01) |
| *H02J 7/00* | (2006.01) |

(52) U.S. Cl.
CPC ............... *G05F 1/46* (2013.01); *G05F 1/563* (2013.01); *G06F 1/263* (2013.01); *H02J 7/0065* (2013.01); *H02J 9/061* (2013.01); *H02M 1/36* (2013.01)

(58) Field of Classification Search
CPC .......... H02J 7/0065; H02J 9/061; H02M 1/36; G05F 1/563; G06F 1/30; G06F 1/305; G06F 1/26; G06F 1/263; G06F 1/28
See application file for complete search history.

(56) References Cited

U.S. PATENT DOCUMENTS

| | | | |
|---|---|---|---|
| 4,673,826 | A | 6/1987 | Masson |
| 5,161,097 | A | 11/1992 | Ikeda |
| 5,777,454 | A | 7/1998 | McAndrews et al. |
| 6,359,794 | B1 | 3/2002 | Real |
| 7,274,116 | B2 | 9/2007 | Inoue et al. |
| 7,391,132 | B2 | 6/2008 | Chen |

(Continued)

FOREIGN PATENT DOCUMENTS

| | | |
|---|---|---|
| KR | 101099933 | 12/2011 |
| KR | 101318960 | 10/2013 |

*Primary Examiner* — Ryan Johnson
(74) *Attorney, Agent, or Firm* — Harness, Dickey & Pierce, P.L.C.

(57) ABSTRACT

A battery backup unit (BBU) for supplying backup power to a load includes at least one battery, an output terminal for coupling to a load, a power converter having an input coupled to the at least one battery and an output coupled to the output terminal, and a bypass circuit having an input coupled to the at least one battery and an output coupled to the output terminal. The power converter is configured to regulate a voltage at the output terminal after startup of the power converter. The bypass circuit is configured to regulate the voltage at the output terminal during startup of the power converter. Other example systems including one or more BBUs are also disclosed.

20 Claims, 4 Drawing Sheets

(56) References Cited

U.S. PATENT DOCUMENTS

| | | | |
|---|---|---|---|
| 7,688,047 B2* | 3/2010 | Sugiyama | H02M 1/36 323/268 |
| 8,723,362 B2* | 5/2014 | Park | G06F 1/30 307/64 |
| 8,971,073 B2 | 3/2015 | Grant et al. | |
| 9,000,613 B2 | 4/2015 | Shetler, Jr. et al. | |
| 9,552,031 B2* | 1/2017 | Sarti | G06F 1/30 |
| 2006/0158165 A1* | 7/2006 | Inn | G05F 1/575 323/280 |
| 2011/0022826 A1* | 1/2011 | More | G06F 1/26 713/1 |
| 2013/0082662 A1 | 4/2013 | Carré et al. | |
| 2014/0167503 A1* | 6/2014 | Redpath | H02J 9/06 307/23 |

\* cited by examiner

BATTERY BACKUP UNITS AND SYSTEMS INCLUDING BYPASSING CIRCUITRY FOR REGULATING OUTPUTS

CROSS-REFERENCE TO RELATED APPLICATION

This application claims the benefit of U.S. Provisional Application No. 62/017,028 filed Jun. 25, 2014.

FIELD

The present disclosure relates to battery backup units and systems including bypassing circuitry for regulating outputs.

BACKGROUND

This section provides background information related to the present disclosure which is not necessarily prior art.

Power systems may include a primary power source and a backup power source for powering a load. When it is determined the primary power source cannot provide adequate power to the load, the backup power source may be activated to temporarily provide backup power to the load. Typically, the backup power source includes an output converter that regulates its output voltage after overcoming a transient condition caused by a load current step from zero to a higher value when the backup power source is activated.

SUMMARY

This section provides a general summary of the disclosure, and is not a comprehensive disclosure of its full scope or all of its features.

According to one aspect of the present disclosure, a battery backup unit (BBU) for supplying backup power to a load includes at least one battery, an output terminal for coupling to a load, a power converter having an input coupled to the at least one battery and an output coupled to the output terminal, and a bypass circuit having an input coupled to the at least one battery and an output coupled to the output terminal. The power converter is configured to regulate a voltage at the output terminal after startup of the power converter. The bypass circuit is configured to regulate the voltage at the output terminal during startup of the power converter.

According to another aspect of the present disclosure, a system for supplying power to one or more loads includes a primary power source for supplying a voltage to one or more loads, a BBU for supplying a backup voltage to the one or more loads, and a control circuit. The BBU is coupled to the primary power source. The BBU includes at least one battery, an output terminal for coupling to the one or more loads, a power converter having an input coupled to the at least one battery and an output coupled to the output terminal, and a bypass circuit having an input coupled to the at least one battery and an output coupled to the output terminal. The control circuit is coupled to the power converter and the bypass circuit. The control circuit is configured to control the power converter to regulate the backup voltage at the output terminal after startup of the power converter and to enable the bypass circuit to regulate the backup voltage at the output terminal during startup of the power converter.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1:
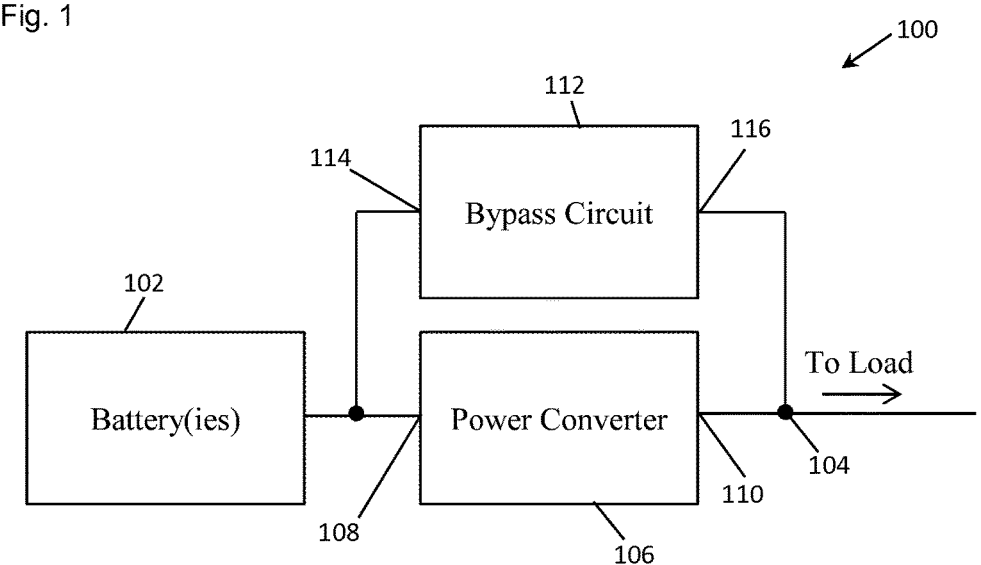
FIG. 1 is a block diagram of a BBU including a bypass circuit and a power converter, each for regulating a BBU output voltage according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A backup battery (BBU) for supplying backup power to a load according to one example embodiment of the present disclosure is illustrated in FIG. 1 and indicated generally by reference number 100. As shown in FIG. 1, the BBU 100 includes at least one battery 102, an output terminal 104 for coupling to a load (not shown), a power converter 106 having an input 108 coupled to the at least one battery 102 and an output 110 coupled to the output terminal 104, and a bypass circuit 112 having an input 114 coupled to the at least one battery 102 and an output 116 coupled to the output terminal 104. The power converter 106 is configured to regulate a voltage at the output terminal 104 after startup of the power converter 106. The bypass circuit 112 is configured to regulate the voltage at the output terminal 104 during startup of the power converter 106.

For example, when a primary power source is unable to provide a desired current and voltage to a load(s), a BBU coupled to the primary power source may provide backup power (e.g., at least temporarily) to the load(s). In such cases, a power converter within this BBU may experience a load current step from zero to a higher current (e.g., a maximum rated current) during startup. In doing so, an output voltage of this converter may experience a transient and thus the output voltage may fall below a minimum threshold voltage for keeping the load(s) active.

By employing the bypass circuit 112 to regulate the voltage at the output terminal 104 during startup of the power converter 106, the BBU 100 may be able to provide a current and regulated voltage to the load(s) at a particular setpoint (e.g., at or above a minimum threshold voltage explained above) until the output voltage of the power converter 106 is regulated at its setpoint. In such examples, the bypass circuit 112 may include circuitry allowing it to have a faster transient response than the power converter 106. As such, the BBU 100 may provide a required current and regulated voltage to the load(s) quicker than other commonly known BBUs relying on a power converter without a bypassing circuit to provide its output power. Thus, the load(s) coupled to the BBU 100 may remain active when power from a primary power source is interrupted.

In the example embodiment of FIG. 1 and as explained above, the inputs 108, 114 of the power converter 106 and the bypass circuit 112 are coupled to the battery 102 and the outputs 110, 116 of the power converter 106 and the bypass circuit 112 are coupled to the output terminal 104 of the BBU 100. As such, the bypass circuit 112 and the power converter 106 are coupled in parallel.

Although not shown in FIG. 1, the battery 102 may have an input coupled to one or more power sources (e.g., a charger) to maintain the battery 102 in a substantially charged state. Thus, and as further explained below, the battery 102 may be a rechargeable battery (e.g., a Li-Ion battery, etc.).

In some embodiments, the bypass circuit 112 and/or the power converter 106 may be controlled by a control circuit. For example, the bypass circuit 112 and/or the power converter 106 may provide a regulated voltage at a setpoint by receiving one or more control signals from the control circuit. In some embodiments, the control circuit may control when the bypass circuit 112 and/or the power converter 106 is enabled and/or disabled.

Figure 2:
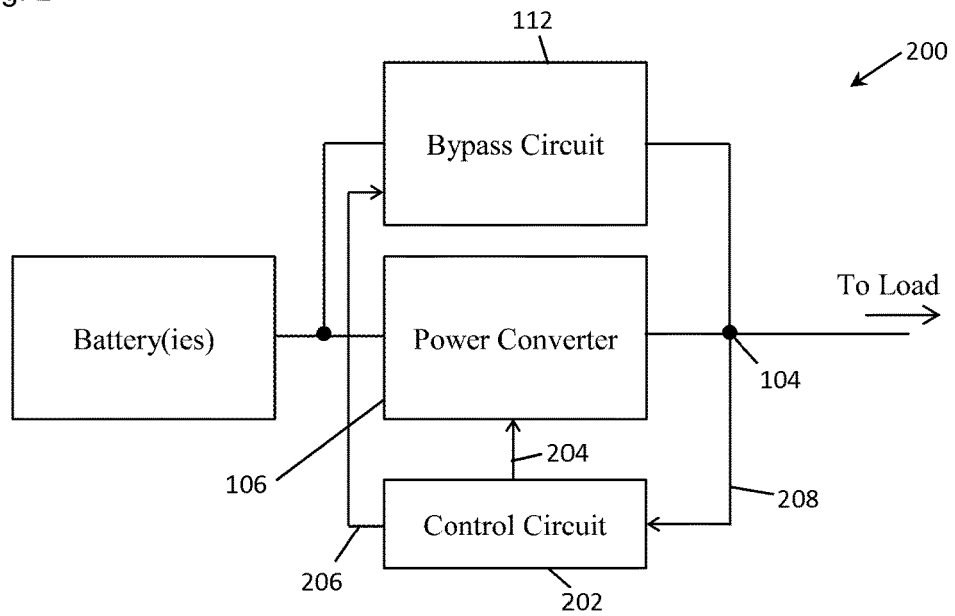
FIG. 2 is a block diagram of a BBU including the bypass circuit and the power converter of FIG. 1, and a control circuit for controlling the bypass circuit and the power converter according to another example embodiment.

For example, FIG. 2 illustrates another BBU 200 substantially similar to the BBU 100 of FIG. 1, but including a control circuit 202 coupled to power converter 106 and the bypass circuit 112. As shown in FIG. 2, the control circuit 202 may provide one or more control signals 204 (e.g., PWM signals, etc.) to the power converter 106 and one or more control signals 206 to the bypass circuit 112. As such, the control circuit 202 may control one or more switches (e.g., one or more enable switches, power switches, etc.) of the power converter 106 and/or the bypass circuit 112.

In some embodiments, the control circuit 202 may enable (e.g., activate, etc.) the bypass circuit 112 to regulate its voltage at the output terminal 104 as explained above. For example, the bypass circuit 112 may include an enable switch for activating the bypass circuit 112 and the control circuit 202 may provide the control signal 206 to the switch when desired. In some examples, the enable switch may be positioned exterior to the bypass circuit 112. For example, the enable switch may be positioned between the bypass circuit 112 and the output terminal 104, between the bypass circuit 112 and the battery 102, etc. In other embodiments, the control circuit 202 may provide one or more control signals 206 to one or more switches in the bypass circuit 112 to activate the circuit 112. The power converter 106 may be enabled in a similar or different manner as the bypass circuit 112.

In some examples, the bypass circuit 112 and/or the power converter 106 may be enabled after detecting a defined parameter. For example, and as shown in FIG. 2, the control circuit 202 receives one or more control signals 208 representing a voltage at the output terminal 104 of the BBU 200. This voltage may be sensed by a commonly known voltage sensor or the like. In such cases, the bypass circuit 112 and/or the power converter 106 may be enabled after the sensed voltage at the output terminal 104 meets, falls below, etc. a defined voltage threshold (e.g., a minimum threshold voltage to maintain the load(s) as explained above), etc. For example, if one or more loads coupled to the output terminal 104 require a regulated voltage of about 12V, the control circuit 202 may enable the bypass circuit 112 and/or the power converter 106 after it senses a voltage at the output terminal 104 of 11V, 11.5V, 11.75V, etc.

In other embodiments, the defined parameter may be another sensed parameter in the BBU 200 and/or a system including the BBU 200. For example, and as further explained below, the control circuit 202 may receive a sensed input voltage of a primary power source coupled to the BBU 200, etc.

In some examples, the control circuit 202 may enable the bypass circuit 112 and the power converter 106 substantially simultaneously. This may allow the bypass circuit 112 to regulate the voltage at the output terminal 104 as soon as its able while allowing the power converter 106 to startup and overcome its possible voltage transient at the same time. As such, the bypass circuit may regulate the voltage at the output terminal 104 during startup of the power converter 106 as explained above. In other embodiments, the bypass circuit 112 may be enabled before or after the power converter 106 if desired.

In the example of FIG. 2, the control circuit 202 may disable (e.g., deactivate, etc.) the bypass circuit 112 following startup of the power converter 106. For example, the control circuit 202 may stop providing a control signal to the bypass circuit 112 once its determined the power converter 106 is able to provide current to the load(s) while being able to regulate the voltage at the output terminal 104. After which, the bypass circuit 112 may stop providing power.

In some examples, the control circuit 202 may disable the bypass circuit 112 after detecting a defined parameter. For instance, the defined parameter may include a sensed voltage and/or current, a defined period of time, a combination of a sensed voltage and/or current and a defined period of time, etc. For example, the bypass circuit 112 may have a setpoint of 11.9V and the power converter 106 may have a setpoint of 12.1V. When the bypass circuit 112 is enabled (as explained above), the bypass circuit 112 regulates the voltage at the output terminal 104 to about 11.9V. Following startup of the power converter 106 (e.g., after the converter can regulate its output), the power converter 106 regulates the voltage at the output terminal 104 to about 12.1V. Once the control circuit 202 detects (e.g., senses, etc.) the voltage at the output terminal 104 is 12.1V via, for example, the control signal 208, the control circuit 202 may disable the bypass circuit 112. Thus, in this example, the defined parameter is a voltage of 12.1 at the output terminal 104.

In other examples, the control circuit 202 may deactivate the bypass circuit 112 about ten (10) milliseconds, about fifteen (15) milliseconds, about twenty (20) milliseconds, more or less than ten (10) milliseconds, more or less than twenty (20) milliseconds, etc. after the power converter 106 is activated. Alternatively, the control circuit 202 may deactivate the bypass circuit 11 in response to a defined period of time (e.g., about ten (10) milliseconds, etc.) after the power converter 106 is activated and after sensing a particular voltage (e.g., 12.1V) at the output terminal 104.

The control circuit 202 may disable the power converter 106 after it detects an output of a primary power source is sufficient to power the load(s), the battery 102 becomes depleted (e.g., unable to provide the required voltage and current to the load, etc.), etc.

The bypass circuits disclosed herein (e.g., the bypass circuit 112 of FIGS. 1 and 2) may be any suitable circuit for regulating its output and that has a desired transient response. In some examples, the bypass circuit may be a linear regulator (sometimes referred to as a linear converter, a series converter, etc.), a switching regulator, etc. having a faster transient response than the power converter 106. Additionally, the power converters disclosed herein (e.g., the power converter 106 of FIGS. 1 and 2) may include any suitable converter for regulating its output. For instance, the power converter 106 may include a switching regulator (e.g., a DC/DC converter, DC/AC inverter, etc.), etc.

Figure 3:
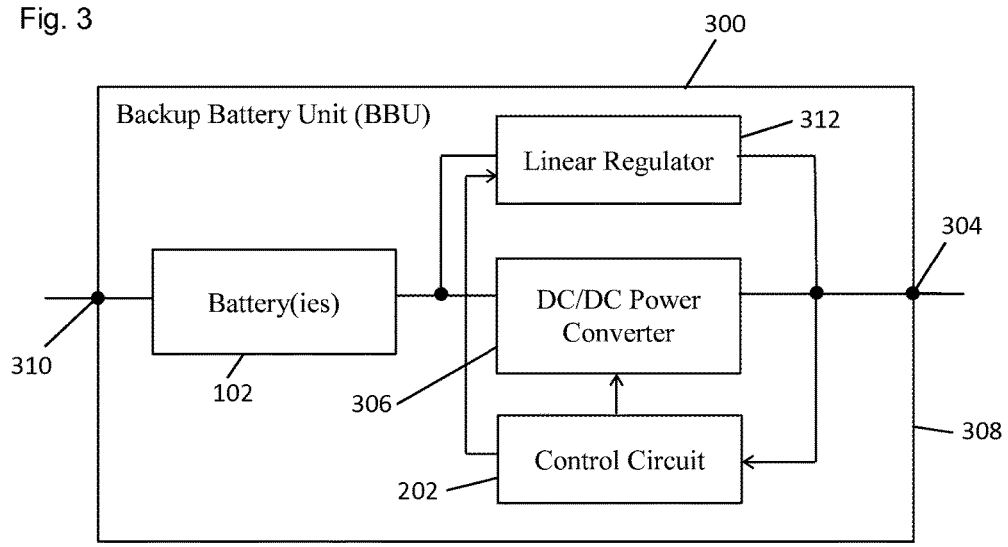
FIG. 3 is a block diagram of a BBU including a linear regulator and a DC/DC power converter according to yet another example embodiment.

For example, FIG. 3 illustrates one example BBU 300 including an input terminal 310 for receiving an input power, the battery 102 of FIG. 1 coupled to the input terminal 310 and an output terminal 304 for coupling to a load (not shown). The battery 102 may receive a charging current and voltage via the input terminal 310 when appropriate.

The BBU 300 further includes a DC/DC power converter 306 coupled between the battery 102 and the output terminal 304, a linear regulator 312 coupled between the battery 102 and the output terminal 304, and the control circuit 202 of FIG. 2 coupled to the DC/DC power converter 306 and the linear regulator 312. In the example of FIG. 3, the inputs and the outputs of the DC/DC power converter 306 and the linear regulator 312 are coupled in the parallel.

Additionally, and as explained above with reference to FIGS. 1 and 2, the linear regulator 312 (e.g., a bypass circuit) regulates a voltage at the output terminal 304 during startup of the DC/DC power converter 306, and the DC/DC power converter 306 regulates the voltage at the output terminal 304 after startup of the DC/DC power converter 306. Following startup of the DC/DC power converter 306, the linear regulator 312 may be disabled as explained above. As such, the linear regulator 312 which is typically less efficient than the DC/DC power converter 306 may provide its maximum rated output power with a regulated output voltage for a short period of time (e.g., until the DC/DC power converter 306 is able to regulate the voltage at the output terminal 304).

As shown in FIG. 3, the BBU 300 includes an enclosure 308 for housing the various components including, for example, the battery 102, the DC/DC power converter 306, the linear regulator 312, the control circuit 202, etc. of the BBU 300, and for defining the input terminal 310 and the output terminal 304. As such, the BBU 300 may be commonly referred to as a BBU module that may be replaceable, moved, etc. depending on power needs, malfunctions, etc.

Although the control circuit 202 is shown within (e.g., internal, etc.) the enclosure 308, the control circuit 202 or a portion of the control circuit 202 may be positioned outside (e.g., external, etc.) the enclosure 308. In some examples, the control circuit 202 may be coupled to a system control that communicates with various BBUs (including the BBU 300), a primary power source, etc. In other embodiments, the control circuit 202 may be a system control and positioned external the enclosure 308.

Figure 4:
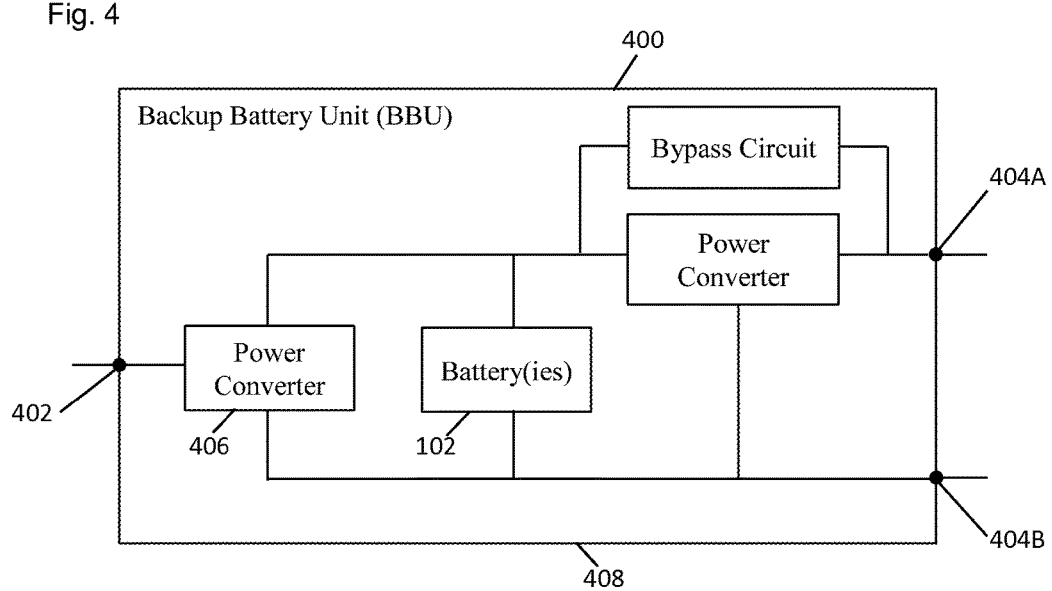
FIG. 4 is a block diagram of a BBU including a charging converter, a battery, a bypass circuit and an output converter according to another example embodiment.

FIG. 4 illustrates another example BBU 400 substantially similar to the BBU 100 of FIG. 1 but including a common return path (e.g., a reference such as ground, etc.) for the components of the BBU. Additionally, the BBU 400 further includes an input terminal 402 similar to the input terminal 310 of FIG. 3, an output terminal 404A similar to the output terminal 304 of FIG. 3, an output terminal 404B for coupling to the common return path, a power converter 406 coupled between the input terminal 402 and the battery 102, and an enclosure 408 similar to the enclosure 308 of FIG. 3.

In the example embodiment of FIG. 4, the power converter 406 may provide a charging current and voltage to the battery 102 when appropriate. The power converter 406 may include any suitable power conversion circuitry including, for example, an AC/DC rectifier and/or a DC/DC power converter.

Figure 5:
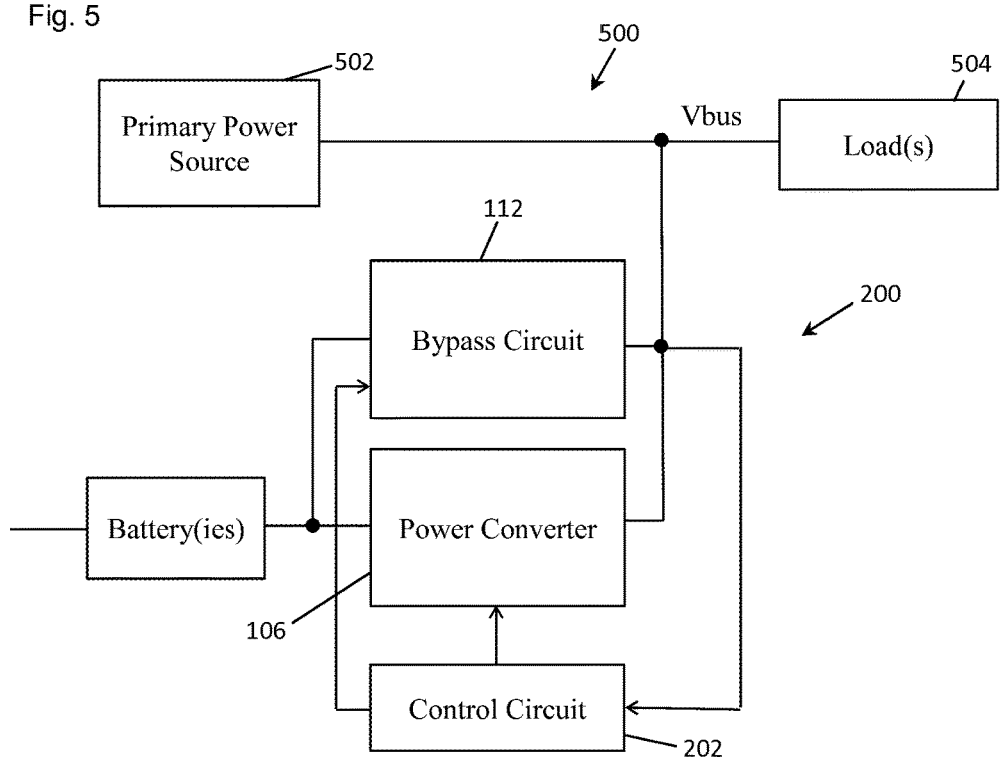
FIG. 5 is a block diagram of a system including a primary power source and the BBU of FIG. 2 coupled to the primary power source according to yet another example embodiment.

In some instances, the BBUs disclosed herein may be part of a power system. For example, FIG. 5 illustrates a system 500 for supplying power to one or more load(s) 504. The system 500 includes a primary power source 502 for supplying a voltage to the load(s) 504 and the BBU 200 of FIG. 2 coupled to the primary power source 502. The BBU 200 supplies a backup voltage to the load(s) when appropriate.

Figure 6:
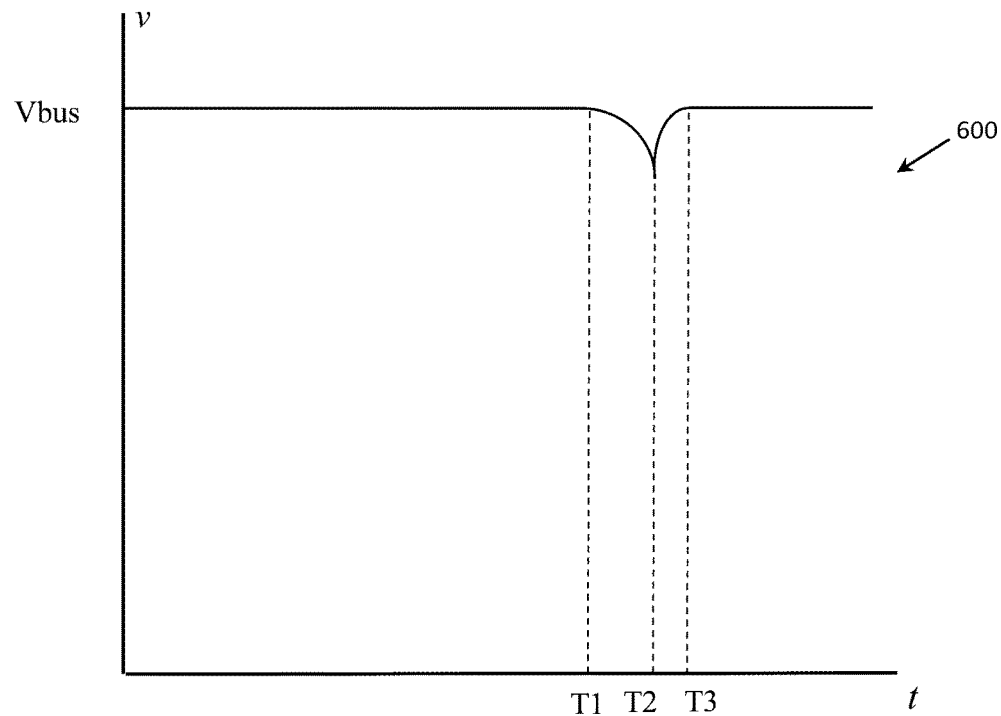
FIG. 6 is a graph of an output voltage of the system of FIG. 5 versus time.

As explained above, the control circuit 202 enables the bypass circuit 112 and/or the power converter 106 to regulate a voltage Vbus at the output (e.g., an output bus) of the system 500. For example, and with reference to the graph 600 of FIG. 6, the primary power source 502 may substantially regulate the voltage Vbus (e.g., at about 12V). In some instances, this voltage may begin to drop due to a malfunction, interruption, etc. related to the primary power source 502. This is shown at time T1 of the graph 600.

When the control circuit 202 detects a defined voltage drop (e.g., a defined voltage below 12V) in the voltage supplied by the primary power source 502, the control circuit 202 may enable the bypass circuit 112 and the power converter 106 as explained above. This is shown at time T2 of the graph 600. Once the bypass circuit 112 is enabled at time T2, the voltage Vbus begins to increase back to the original regulated value (e.g., about 12V), a voltage slightly below the regulated value (e.g., about 11.9V), etc. depending on the setpoint of the bypass circuit 112.

After startup of the power converter 106, the power converter 106 is able to regulate the voltage Vbus at the original regulated voltage (e.g., about 12V), a voltage slightly higher than the bypass circuit's setpoint, a voltage slightly higher than the original regulated voltage (e.g., about 12.1V), etc. depending on the setpoint of the power converter 106. Once the control circuit 202 detects the voltage Vbus has increased to its original regulated voltage, a voltage slightly higher than the bypass circuit's set point (e.g., 12.1V), etc., the control circuit 202 may disable the bypass circuit 112. This is shown at time T3 of the graph 600. The power converter 106 may continue to regulate the voltage Vbus until the battery 102 is depleted, the primary power source 502 is providing sufficient power to the load(s) 504, etc.

Figure 7:
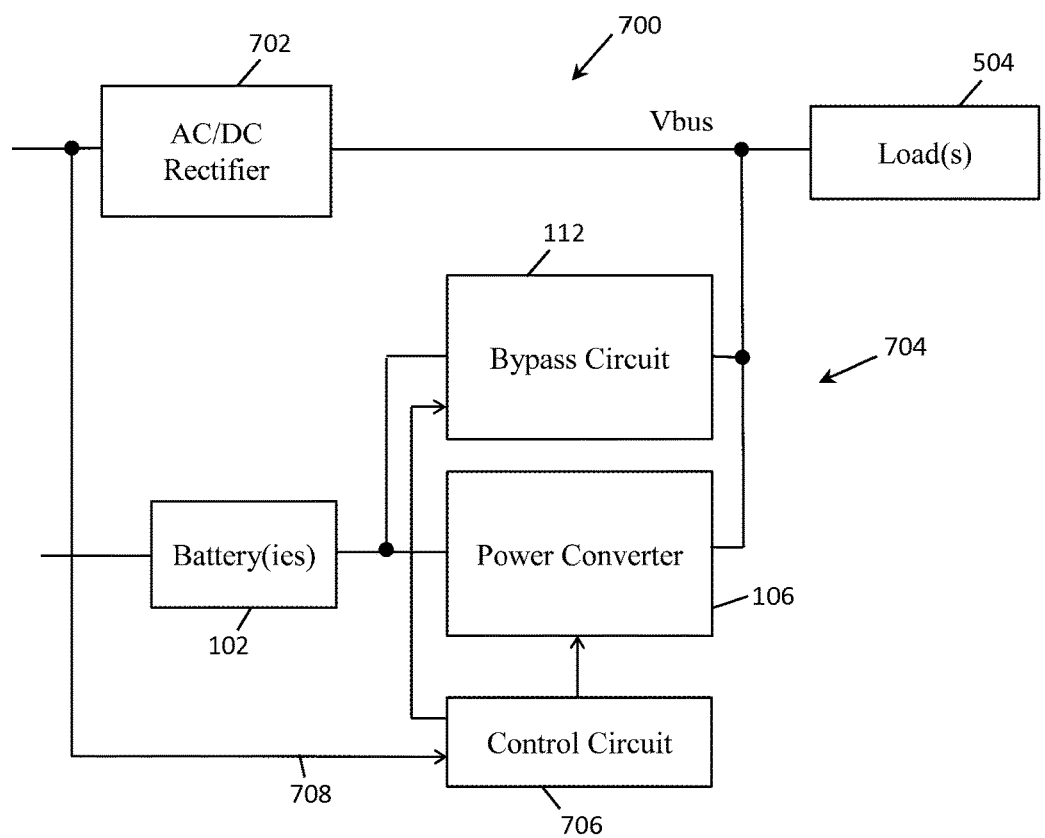
FIG. 7 is a block diagram of a system including a rectifier and a BBU controlling its bypass circuit based on an input to the rectifier according to yet another example embodiment.

Although FIG. 5 illustrates the system 500 including the BBU 200 of FIG. 2, it should be apparent that any suitable BBU including those disclosed herein may be employed without departing from the scope of the disclosure. For example, FIG. 7 illustrates another example system 700 including an AC/DC rectifier 702 for supplying a voltage to the load(s) 504 and a BBU 704 coupled to the rectifier 702. The BBU 704 is substantially similar to the BBU 200 of FIG. 2. For example, the BBU 704 includes the battery 102, the bypass circuit 112, and the power converter 106 of FIG. 1 and, a control circuit 706 coupled to the bypass circuit 112 and the power converter 106.

As shown in FIG. 7, the control circuit 706 receives a signal 708 representing an input voltage of the rectifier 702. As such, the control circuit 706 may enable the bypass circuit 112 and/or the power converter 106 after detecting a drop in voltage at the rectifier's input. In such cases, the control circuit 706 may detect a possible interruption in power from the rectifier 702 before the output of the rectifier begins to fall below its regulated voltage (e.g., about 12V, etc.) and enable the bypass circuit 112 and/or the power converter 106 accordingly.

The control circuit 706 may disable the bypass circuit 112 and/or the power converter 106 as explained above. For example, although not shown, the control circuit 706 may disable the bypass circuit 112 after detecting a defined voltage of the output of the system 700, etc.

Although FIGS. 5 and 7 illustrate a system including one BBU, it should be apparent that each system may include any suitable number of BBUs. For example, the system 500 of FIG. 5 may include three BBUs including the BBU 200 and the system 700 of FIG. 7 may include ten BBUs including the BBU 704. In such examples, each BBU may include its own control circuit that communicates with other control circuit(s). Alternatively, a system control circuit may control two or more BBUs and/or other power components of a system. Additionally, some or all of the BBUs may be coupled in parallel. For example, if the system 500 includes three BBUs as explained above, the outputs of two of those BBUs may be coupled in parallel.

The control circuits disclosed herein may be any suitable control circuit. For example, some or all of a control circuit may be internal a particular BBU, internal a power converter of a BBU, external a BBU (e.g., a system control for one or more BBUs and/or other power components in a system), etc.

The control circuits may include an analog control circuit, a digital control circuit (e.g., a digital signal processor (DSP), a microprocessor, a microcontroller, etc.), or a hybrid control circuit (e.g., a digital control circuit and an analog control circuit). Thus, the methods disclosed herein may be performed by a digital controller. Additionally, the entire control circuit, some of the control circuit, or none of the control circuit may be an integrated circuit (IC).

The batteries disclosed herein may be any suitable battery. For example, the batteries may include rechargeable batteries such as Li-Ion batteries, NiCd batteries, NiMH batteries, etc., single use batteries, etc. Additionally, each BBU disclosed herein may include one or more batteries. For example, the BBU 100 of FIG. 1 may include a battery pack of four batteries, the BBU 200 of FIG. 2 may include five batteries, and the BBU 704 of FIG. 7 may include one battery. If two or more batteries are employed in a BBU, some or all of those batteries may be coupled in parallel and/or series.

The systems and/or the BBUs disclosed herein may be employed in any suitable application including, for example, telecommunication applications, information technology applications, etc. For example, the systems and/or the BBUs may be employed in enclosures (e.g., data racks, server cabinets, etc.) including, for example, stationary and/or modular enclosures. Additionally, the systems and/or the BBUs may provide any suitable output power including, for example, AC power and/or DC power. In some embodiments, the systems and/or the BBUs may provide 5 VDC, 12 VDC, 24 VDC, 48 VDC, 400 VDC, 120 VAC, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A battery backup unit (BBU) for supplying backup power to a load, the BBU comprising:
   at least one battery;

an output terminal for coupling to a load requiring a defined amount of current to keep the load active;

a DC/DC switching power converter having an input coupled to the at least one battery and an output coupled to the output terminal, the DC/DC switching power converter configured to output a regulated voltage to the output terminal and the defined amount of current to the load after startup of the DC/DC switching power converter to keep the load active;

a linear regulator having an input coupled to the at least one battery and an output coupled to the output terminal; and a control circuit configured to enable the linear regulator to output a regulated voltage to the output terminal and the defined amount of current to the load during startup of the DC/DC switching power converter to keep the load active, and disable the linear regulator following startup of the DC/DC switching power converter after detecting a voltage at the output terminal is larger than the regulated voltage provided by the linear regulator.

2. The BBU of claim 1 wherein the control circuit is configured to enable the linear regulator after detecting a defined parameter.

3. The BBU of claim 2 wherein the defined parameter includes a defined voltage drop at the output terminal.

4. The BBU of claim 2 wherein the control circuit is configured to enable the DC/DC switching power converter after detecting the defined parameter.

5. The BBU of claim 4 wherein the control circuit is configured to enable the linear regulator and the DC/DC switching power converter simultaneously.

6. The BBU of claim 1 wherein the linear regulator and the DC/DC switching power converter are coupled in parallel.

7. The BBU of claim 1 wherein the control circuit is configured to control the DC/DC switching power converter to output the regulated voltage to the output terminal.

8. The BBU of claim 1 wherein the control circuit is configured to enable the linear regulator and the DC/DC switching power converter simultaneously.

9. The BBU of claim 1 further comprising an input terminal and a power converter coupled between the input terminal and the at least one battery.

10. A system for supplying power to one or more loads, the system comprising:

a primary power source for supplying a voltage to one or more loads requiring a defined amount of current to keep the load active;

a battery backup unit (BBU) for supplying a backup voltage to the one or more loads when the primary power source is unable, the BBU coupled to the primary power source, the BBU including at least one battery, an output terminal for coupling to the one or more loads, a DC/DC switching power converter having an input coupled to the at least one battery and an output coupled to the output terminal, and a linear regulator having an input coupled to the at least one battery and an output coupled to the output terminal; and a control circuit coupled to the DC/DC switching power converter and the linear regulator, the control circuit configured to control the DC/DC switching power converter to output a regulated backup voltage to the output terminal and the defined amount of current to the one or more loads after startup of the DC/DC switching power converter to keep the one or more loads active, enable the linear regulator to output a regulated backup voltage to the output terminal and the defined amount of current to the one or more loads during startup of the DC/DC switching power converter to keep the one or more loads active, and disable the linear regulator following startup of the DC/DC switching power converter after detecting a voltage at the output terminal is larger than the regulated backup voltage provided by the linear regulator.

11. The system of claim 10 wherein the control circuit is configured to enable the linear regulator after detecting a defined parameter.

12. The system of claim 11 wherein the defined parameter includes a defined voltage drop in the voltage supplied by the primary power source.

13. The system of claim 11 wherein the control circuit is configured to enable the linear regulator and the DC/DC switching power converter simultaneously after detecting the defined parameter.

14. The system of claim 10 wherein the linear regulator and the DC/DC switching power converter are coupled in parallel.

15. The system of claim 10 further comprising the one or more loads coupled to the primary power source and the linear regulator, the one or more loads requiring the defined amount of current and a defined regulated voltage to remain active.

16. The system of claim 10 wherein the control circuit is configured to enable the linear regulator and the DC/DC switching power converter simultaneously.

17. The system of claim 16 wherein the linear regulator and the DC/DC switching power converter are coupled in parallel.

18. The system of claim 16 wherein the control circuit is configured to enable the linear regulator after detecting a defined parameter.

19. The system of claim 18 wherein the defined parameter includes a defined voltage drop in the voltage supplied by the primary power source.

20. The system of claim 10 wherein the at least one battery includes a rechargeable battery and wherein the primary power source is configured to output a charging current to the rechargeable battery.

* * * * *